F. W. WOLFF.
APPARATUS FOR THE EXTRACTION OF OILS AND RESINS FROM HOPS.
APPLICATION FILED JUNE 30, 1917.
1,319,984.
Patented Oct. 28, 1919.
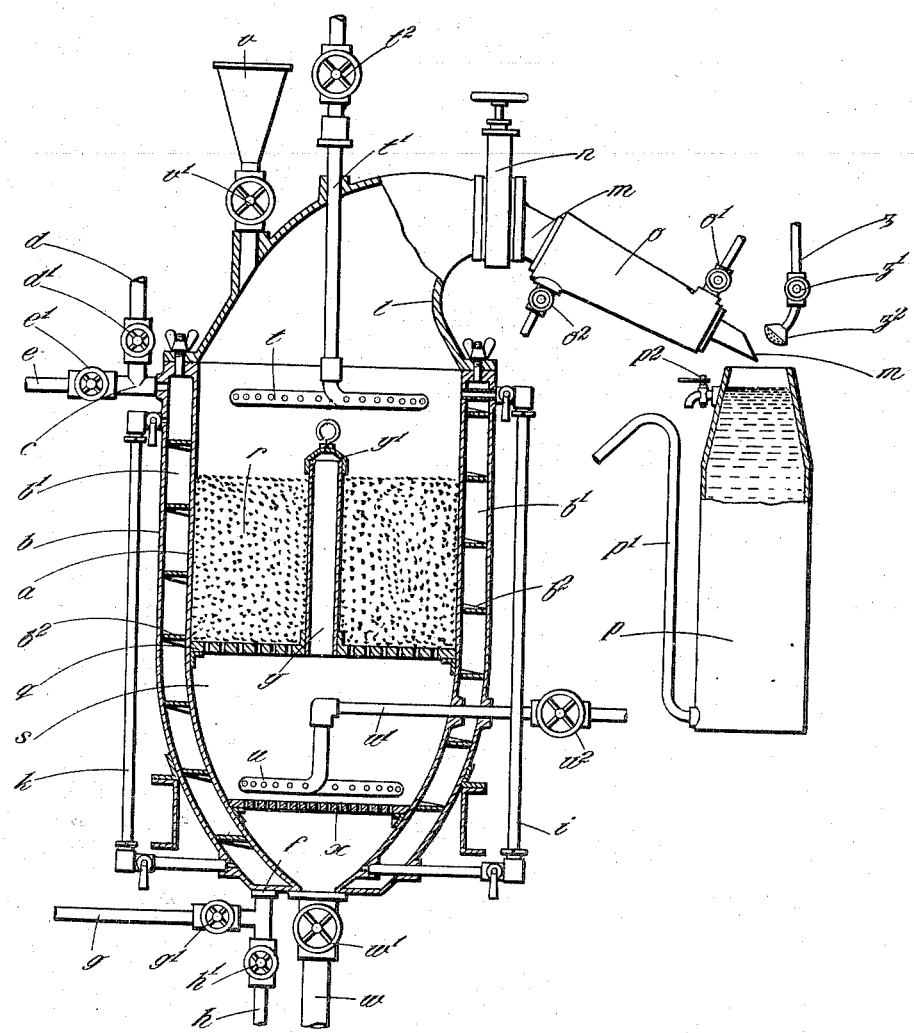

UNITED STATES PATENT OFFICE.

FREDERICK WILLIAM WOLFF, OF LONDON, ENGLAND.

APPARATUS FOR THE EXTRACTION OF OILS AND RESINS FROM HOPS.

1,319,984.                    Specification of Letters Patent.        Patented Oct. 28, 1919.

Application filed June 30, 1917. Serial No. 177,926.

*To all whom it may concern:*

Be it known that I, FREDERICK WILLIAM WOLFF, a subject of the King of Great Britain, residing at 33 Little Alie street, Leman street, London, E., England, brewers' engineer, have invented certain new and useful Improvements in and in Apparatus for the Extraction of Oils and Resins from Hops, of which the following is a specification.

This invention relates to an improved process of, and apparatus for, effecting the extraction from hops of the oils and resins which form the valuable constituents of the plant; the primary object of the invention being to enable a higher proportion of such constituents to be obtained than heretofore, with the minimum expenditure of alcohol and without subjecting the hops to boiling which, as is well known, is detrimental to the product in respect of both quality and yield.

The process of the present invention consists in subjecting the hops to the action of alcoholic vapor of different percentages as best suited for the purpose required so as to dissolve out the resins and volatilize the oils, the recovery of the oils being effected by distillation and the resins being concentrated from the liquor wherein they are dissolved, while all the operations are carried out at a temperature below that at which the resins would become hardened. The soft resins tend to become hardened by water treatment approximately between 0° F. and 212° F., all the softer resins becoming hard at the latter temperature while none of the softer resins become hardened with vapor treatment approximately between the temperatures 170° F. and 174° F. provided the hops are free from water.

The vapor may be of different alcoholic values according to the character of the hops to be dealt with and the nature of the constituent or constituents which it is desired for the time being to extract; the function of the alcohol being to dissolve both the oily and the resinous constituents of the hops and permit the ready volatilization of the oils at a temperature below that at which the resins would tend to become hard. Thus, relatively low-value alcoholic vapor suffices for the preliminary extraction of the oils alone, but relatively high-value alcoholic vapor is preferable for the subsequent extraction of the softer resins or for the concurrent extraction of the softer resins together with the oils, while somewhat prolonged treatment by means of warm water (with or without the admixture of a small proportion of alcohol) and very low-value alcoholic vapor is best suited for effecting the final extraction of the harder resins remaining in the hops after both the oils and the softer resins have been extracted. If oils and resins be extracted together, it is necessary to separate them from one another.

The process as a whole is capable of being carried out industrially according to either of two alternative methods which may be distinguished from one another as Method A and Method B respectively.

According to Method A, the hops are subjected in a still heated below 212° F. to the action of low-value alcoholic vapor so as to effect the extraction of the oils by distillation along with the alcohol, the oily and alcoholic constituents of the distillate being separated from one another by gravity or other convenient means. The hops are then subjected while at a much lower temperature to the action of high value alcoholic vapor so as to dissolve out the softer resins, which may be separated from the alcoholic liquor by gravity and concentrated to any desired density by evaporation. The hops are then submerged in warm water (with or without the admixture of a small proportion of alcohol) and subjected to the action of low-value alcoholic vapor so as to dissolve out the harder resins, which are separated from the alcoholic liquor and concentrated as before.

According to Method B, the hops are subjected in the cool to the action of high value alcoholic vapor so as to dissolve out both the oils and also the softer resins. The resulting liquor may be heated so as to effect the recovery of the oils by distillation and the separation and concentration of the resins by evaporation; or the resins may be first separated from the liquor by gravity and concentrated to any desired density by evaporation, and the oils recovered from the supernatant liquor by distillation and subsequent separation from the alcohol in the distillate. The hops are then submerged in warm water (with or without the admixture of a small proportion of alcohol) and subjected to the action of low-value alcoholic vapor so as to dissolve out the harder resins, which may be concentrated to any desired density by evaporation.

Both of these methods are applicable to hops generally but Method B is especially suitable for the treatment of hops (such as old hops) containing a comparatively small quantity of oil the separate extraction of which at the commencement of the process might tend so to harden the resinous matter in the hops as to jeopardize the subsequent complete recovery of the resinous residuum left after the extraction of the oils.

Although the above described methods of carrying out the improved process are of practical value for industrial purposes, it is to be observed that the use of high-value alcoholic vapor, is not essential, as not only the oils but also both the softer and harder resins may all be extracted together by submerging the hops in warm water (with or without the admixture of a small proportion of alcohol) and passing through the mass, for a sufficient time, low value alcoholic vapor; the oils being recovered from the liquor by distillation along with the alcohol and subsequent separation from the latter, while the resins may be concentrated by evaporation. This third method is however liable to prove less effectual (as regards e. g. the extraction of some of the resinous constituents of the hops) and in any case does not enable the softer and more valuable resins to be separated from the harder resins, but allows both to remain behind in the liquor after the volatilization of the oils and alcohol.

The several stages or operations comprised in methods A and B respectively will now be described in greater detail.

Method A.

*First stage.*—The hops, pulverized as usual, are subjected in a still heated below 212° F. to the action of low-value alcoholic vapor injected into the still continuously so as to permeate and pass through the mass of hops therein and carry over into a condenser, in the form of vapor, the oils dissolved out from the hops, while leaving in the latter practically the whole of the resinous constituents. This operation may be allowed to continue until oils are no longer found to be present in the distillate; whereupon the supply of alcoholized steam is cut off, and the hops are subjected in the still to the action of a gentle degree of heat alone so as to be caused to give up by evaporation such alcohol and oil-vapor as may then remain within the mass. This alcohol and oil-vapor is passed through the condenser as before, so as to be caused to give up any oil carried over from the still while the hops themselves become gradually dried by continued exposure to heat within the still. The alcohol separated from the oils in the distillate by siphoning or other convenient means, may be used over again, while the oily residue is stored.

As a rule, about one gallon (more or less) of an 8 per cent. alcoholic solution is required per lb. of hops, in the first stage of the process.

*Second stage.*—The hops, dried as above described, are subjected in a still (preferably cooled) to the action of high-value alcoholic vapor as required, injected into the still continuously so as to permeate and pass through the mass of hops therein and carry into a condenser or collector the greater part of the softer resins dissolved out from the hops. This operation may be allowed to continue until the softer and more valuable resins are no longer found to be present in the condensate; whereupon the supply of alcoholic vapor is cut off, and the hops may then be subjected to mechanical pressure within the cold still so as to be caused to give up the alcoholic liquor remaining within the mass. The expressed liquor with the condensate from the previous part of this second stage, is allowed to settle, and the alcohol having been siphoned off or otherwise removed, the resinous residuum is allowed to evaporate until it attains the requisite density, and is then stored.

As a rule, about one gallon of a 67 per cent. alcoholic solution is required per pound of hops, in the second stage of the process.

*Third stage.*—The mass of hops, containing a certain quantity of alcoholic liquor remaining from the second stage, is submerged in warm water and, during submergence, is subjected in a still, heated below 212° F., to the action of low-value alcoholic vapor this vapor being injected into the still continuously so as to permeate and pass through the mass of hops therein. The resulting vapor is passed into a condenser for the recovery of the alcohol, while the resinous matter is left in the liquor, which is allowed to drain from the hops. When this operation has proceeded as long as may be found necessary, the supply of alcoholic vapor is cut off and the liquor, after being allowed to evaporate until the resinous residuum attains the requisite density is stored.

Method B.

*First stage.*—The pulverized hops are subjected in a still (preferably cooled) to the action of "high-value" alcoholic vapor at a low pressure, injected into the still continuously so as to permeate and pass through the mass of hops therein and pass thence into a condenser or collector; the alcoholic vapor which extracts from the hops both the oils and also the greater part of the softer resins, carrying both these constituents into the collector wherein is deposited a condensate containing the oils and resins mixed together in the form of an alcoholic solution. This operation may be allowed to continue until the oils, and the softer and more valuable resins, are no longer found to be present in the condensate; whereupon the supply of alcoholic vapor is cut off, and the hops may then be subjected to mechanical pressure within the cold still so as to be caused to give up any free alcoholic liquor condensed and remaining withing the mass, the expressed liquor being mixed with the condensate from the previous part of the operation.

*Second stage.*—In order to separate the oils from both the resinous and alcoholic constituents of the liquor, the whole condensate (or the supernatant portion thereof after the resins have been allowed to settle to the bottom) is subjected in a still to a gentle heat sufficient to volatilize the alcohol, the vapor of which carries the oils over with it through a condenser, leaving behind the resins which may be concentrated by evaporation. The alcoholic distillate issuing from the condenser is mixed with cold water whereby it is caused to separate from the oils, which float to the top of the receiver, while the alcohol can be rectified and used over again.

*Third stage.*—The harder resins remaining in the hops may be recovered by the method described under the third stage of Method A as set forth above.

It is important that the hops should never be subjected to a temperature above that at which the resins would become hardened, as any higher temperature would tend to affect detrimentally the resinous constituents remaining in the hops, by hardening these constituents and, while rendering them more difficult of extraction, reducing their ultimate value. In general, the lower the temperature the better the result as regards both the quality and quantity of the resins obtained. The lower the temperature employed, however, the longer will be the time occupied by the process.

All stages of the process according to either of the methods above described may be carried out in the same apparatus so as to obviate the necessity of transferring the hops from one vessel to another in succession during the complete series of operations; or separate sets of apparatus, especially adapted for the requirements of the respective stages, may be employed, the hops in such case being transferred successively from one set of apparatus to the next at the proper time.

The accompanying drawing illustrates a convenient form of apparatus adapted for carrying out the entire series of operations within a single vessel, which is shown diagrammatically in sectional elevation.

The apparatus comprises a still $a$, the body of which has a cylindrical upper portion and a conical lower portion. The still $a$ is surrounded throughout its entire depth by a jacket $b$ to which are connected on the one hand at $c$ a steam supply pipe $d$ and a water outlet pipe $e$, and on the other hand at $f$ a steam outlet pipe $g$ and a water supply pipe $h$, the pipes $d$, $e$, $g$, and $h$ being provided with stop-valves $d^1$, $e^1$, $g^1$ and $h^1$ respectively. In order to insure proper circulation of steam or water through the jacket $b$, the space $b^1$ between the jacket and the wall of the still $a$ is shown as provided with a helically-winding baffle or partition $b^2$.

The still has a movable cover $l$ and neck $m$ leading, by the way of a stop valve $n$, to a worm or other form of condenser $m$ adapted for delivering the distillate into a collecting vessel $p$ and furnished with a cold water circulation-device of any known or convenient type. In the example illustrated, $o^1$ and $o^2$ represent the cold water inlet and outlet respectively, each being provided with a regulating valve as indicated.

Within the body of the still is mounted a perforated floor $q$ for the support of the mass of hops $r$, which are introduced into the still when the cover $l$ has been removed, the level of the perforated floor $q$ being so far above the bottom of the still as to leave beneath the floor a chamber $s$ affording sufficient space for the accumulation of liquor.

Above the surface level of the mass of hops in the still is mounted a coil $t$ of perforated steam-tubing connected externally with a source of alcoholic vapor supply, the pipe $t^1$ which is furnished with a stop-valve $t^2$, passing through the detachable cover $l$ of the still so as to render the coil $t$ removable as one with the cover. A second coil $u$ of perforated tubing is mounted in the lower part of the liquor chamber $s$, this coil being connected externally with a source of alcoholic vapor supply by way of a pipe $u^1$ furnished with a stop-valve $u^2$. An inlet $v$ for water, warm or cold, at the top of the still is furnished with a stop valve $v^1$, while an outlet $w$ for liquor from the bottom of the still is provided with a stop valve $w^1$.

A foraminous diaphragm $x$, having perforations preferably smaller than those of the perforated floor $q$, may be mounted in the liquor-chamber $s$ beneath the coil $u$ so as to prevent any fragments of hops which may pass through the floor $q$ from gaining access to such resinous matter as may be allowed to settle in the lower part of the chamber $s$.

The perforated floor $q$ has a somewhat large central aperture in which is removably fixed a pipe $y$, of corresponding diameter, which extends upward above the surface-level of the mass of hops $r$ resting upon the floor $q$; the upper end of the pipe $y$ being closed by a removable cap $y^1$.

A water-supply pipe $z$, provided with a stop-valve $z^1$, is adapted to deliver, when required, cold water through a sprinkler $z^2$ against the distillate as the latter falls from the neck $m$ of the still into the container $p$.

Gage-glasses $j$ and $k$ are provided for enabling the levels of liquor contained in the still $a$ and jacket-space $b^1$ respectively to be ascertained.

In using this apparatus for carrying out the improved process according to Method A, the cover $l$ of the still is removed, the cap $y^1$ fixed in position upon the pipe $y$, and a suitable charge of ground hops is thrown into the still so as to rest upon the perforated floor $q$. The cover $l$ having been replaced and the valve $n$ opened, low-pressure steam (or it might be warm water) is set in circulation through the jacket-space $b^1$ while cold water is passed through the condenser $o$. Low-value alcoholic vapor is then slowly injected through the lower coil $u$ (usually for an hour or two) so as to gradually effect the volatilization of the oils contained in the hops $i$, the vapor passing over from which becomes condensed in the neck $m$ while the distillate is collected in the vessel $p$. When it is found that oils have ceased to pass over, the valve $u^2$ is closed so as to cut off the supply of alcoholic vapor, but the circulation of steam through the jacket-space $b^1$ is continued until all (or substantially all) the moisture present in the hops has been evaporated and passed through the condenser to the vessel $p$, from the alcoholic contents of which the oils may be separated by gravity or other convenient means. The alcohol may be rectified for further use.

On the completion of this first stage of the process, the supply of steam to the jacket-space $b^1$ is stopped, cold water is set in circulation through said space, and high-value alcoholic vapor is slowly injected through the upper coil $t$ (usually for about 4 to 8 hours) so as to gradually effect the separation of the softer resins contained in the hops and carry these resins, in a state of solution in the condensed alcoholic liquor, down through the perforated floor $q$ into the liquor-chamber $s$. When it is found that the resins have ceased to yield to this treatment, the cover $l$ is removed and mechanical pressure is applied from above (by any convenient means) to the mass of hops $r$ so as to squeeze out the greater part of the alcoholic liquor remaining therein. The liquor which has collected in the chamber $s$ (the valve $w^1$ being closed), and which consists mainly of an alcoholic solution of the softer resins, is then drained off through the valve $w^1$ into a suitable receptacle wherein the resinous matter is allowed to settle, after which the supernatant alcoholic liquor may be siphoned off and the alcohol rectified for further use, while the resinous residuum is concentrated by evaporation.

After the liquor in the chamber $s$ has been drained off, the valve $w^1$ is closed, the cover $l$ replaced, the valve $n$ opened, and cold water set in circulation through the condenser $o$. Low-pressure steam is now set in circulation through the jacket-space $b^1$, and warm water is introduced into the still through the valve $v^1$ until the mass of hops $r$ is submerged. Low-value alcoholic vapor is then slowly injected through the lower coil $u$ (usually for about 5 to 10 hours) so as to gradually dissolve out from the hops the remaining resinous matter, consisting for the most part of the harder resins; the vapor carrying over through the condenser $o$ the alcohol, which may afterward be rectified. When the operation has continued as long as may be found necessary, the liquor within the still is drained off through the valve $w^1$ into a suitable receptacle wherein it may (if necessary) be allowed to stand until the resinous matter has settled, after which the supernatant alcoholic liquor may be siphoned off and the alcohol rectified for further use, while in any case the resinous matter present in the liquor is concentrated by evaporation. The process as a whole is now complete, and the hops which have been treated may be removed from the still and replaced by a fresh charge.

In using the apparatus for carrying out the improved process according to Method B, a charge of ground hops is placed upon the perforated floor $q$ as before, and the still having been hermetically closed and cold water set in circulation through the jacket-space $b^1$, high-value alcoholic vapor is slowly injected through the upper coil $t$, usually for about 4 to 8 hours. The vapor permeates and becomes condensed within the mass of hops $r$, the alcohol dissolving out both oils and the softer resins, which are carried down with the condensed liquor through the floor $q$ into the chamber $s$. The oils are the constituent which is most readily separated, and when it is found that the resins have ceased to yield to the operation, the cover $l$ is removed and mechanical pressure is applied from above (by any convenient means) to the mass of hops $r$ so as to squeeze out the greater part of the free liquor remaining therein. The liquor which has collected in the chamber $s$ (the valve $w^1$ being closed) may be allowed to stand in the cold still until the resinous portion has settled to the bottom, whereupon this resinous precipitate is preferably drawn off through the valve $w^1$ into a suitable vessel and concentrated to the desired consistency by evaporation.

The remaining liquor, consisting mainly of an alcoholic solution of the oils, is preferably retained within the chamber $s$ and treated as follows: The cap $y^1$ having been removed from the pipe $y$, the cover $l$ is replaced and the cold water is drained out of the jacket-space $b^1$. The valve $n$ is opened, and cold water caused to circulate through the condenser $o$, whereupon low-pressure steam (or warm water), is set in circulation through the jacket-space $b^1$. The heat thus communicated to the contents of the still causes the alcoholic solution of the oils within the space $s$ to evaporate; the vapor, which rises freely through the pipe $y^1$, mingling with the vapor from the hops $r$ and passing into the neck $m$ of the still, where it becomes condensed. This distillate may be allowed to fall into a collecting vessel such as $p$, and in order to effect at once the separation of the oils from the alcohol in the distillate, the latter, as it issues from the still-neck $m$, is caused to encounter a spray of cold water from the sprinkler $z^2$; this water, by mingling with the distillate, so diluting the alcohol as to render it incapable of retaining the oils in solution. The oils, therefore, becoming separated from the alcohol, rise to the surface of the liquid in the receiver $p$ and may be decanted or siphoned off, while the alcoholic residue may be rectified and used again.

When this stage of the process is complete, the hops $r$ remaining in the still are treated as already described with reference to the use of the same apparatus for carrying out Method A, in order to obtain the harder resins. When this has been done, the process as a whole is complete, and the hops which have been treated may be removed from the still and replaced by a fresh charge.

The separation of the oil from the alcoholic liquor in the collector $p$ may go on continuously and concurrently with the passing of the liquor from the collector to the rectifying apparatus. For this purpose the vessel $p$ is made sufficiently deep to afford time for the particles of oil, as they descend through the vessel after the distillate has encountered the cold water spray from the sprinkler $z^2$, to become freed from the rest of the liquor and rise to the surface. In order that, meanwhile, the level of the liquid in the vessel $p$ may remain substantially constant, the alcoholic liquor from which the oil has thus become separated is continuously drawn off by means of a siphon tube $p^1$ which rises from the lower part of the vessel to a level slightly below that at which the separated oil collects; while the oil itself may be withdrawn from time to time (or continuously if desired) through a tap $p^2$.

What I claim and desire to secure by Letters Patent of the United States is:—

1. The process for treating hops for the extraction of the oils and resins contained therein, which consists in subjecting the hops to the action of alcoholic vapor so as to dissolve out the resins and volatilize the oils, the process being carried out at a temperature below that at which the resins would become hardened.

2. In the process of extracting the oils and resins from hops, the improvement which comprises subjecting the hops in a still heated below 212° F., to the action of low-value alcoholic vapor so as to effect the extraction of the oils by distillation; then subjecting the hops at a substantially lower temperature to the action of high-value alcoholic vapor so as to dissolve out the softer resins; separating the resins from the resulting liquor; submerging the hops in warm water and passing therethrough low-value alcoholic vapor so as to dissolve out the harder resins; and separating the resins from the resulting liquor substantially as set forth.

3. The process of extracting oils and resins from hops which comprises subjecting the hops to the action of a low-value alcoholic vapor to dissolve out the resins and volatilize the oils and concentrating the resins from the liquor wherein they are dissolved, the operations being carried out at a temperature below that at which the resins become hardened.

4. In the process of extracting the oils and resins from hops, the improvement which comprises subjecting the hops in a still heated below 212° F. to the action of low-value alcoholic vapor so as to effect the extraction of the oils by distillation; then subjecting the hops at a substantially lower temperature to the action of high-value alcoholic vapor so as to dissolve out the softer resins; separating the resins from the resulting liquor by gravity and concentrating them by evaporation; submerging the hops in warm water and passing therethrough low-value alcoholic vapor so as to dissolve out the harder resins; and separating the resins from the resulting liquor by gravity and concentrating them by evaporation; substantially as set forth.

5. In the process of extracting the oils and resins from hops, the improvement which comprises subjecting the hops at a temperature too low to harden the soft resins to the action of high value alcoholic vapor so as to dissolve out both the oils and the softer resins; subjecting the resulting liquor to heat so as to effect the recovery of the oils by distillation and the separation and concentration of the resins by evaporation; submerging the hops in warm water and passing therethrough low value alcoholic vapor so as to dissolve out the harder resins; and separating the resins from this liquor by gravity and concentrating them by evaporation, substantially as set forth.

6. In the process of extracting the oils and resins from hops, the improvement which comprises subjecting the hops, at a temperature too low to harden the softer resins, to the action of high-value alcoholic vapor to dissolved oils and the softer resins, separating the resins and the oils from the resulting liquid, submerging the treated hops in warm water and passing therethrough low-value alcoholic vapor to dissolve out the harder resins and separating such harder resins from the liquor.

7. In the extraction of oils and resins from hops, the improvement which comprises first subjecting the hops at a temperature too low to harden the soft resins to the action of high-value alcoholic vapor to dissolve out both the oils and the soft resins, separating the resins from the resulting liquor by gravity and concentrating the same by evaporation, subjecting the supernatant liquor to distillation, to separate the oils therefrom; submerging the hops in warm aqueous liquid and passing therethrough low-value alcoholic vapor to dissolve out the harder resins, separating such harder resins from this aqueous liquor by gravity and concentrating them by evaporation.

FREDERICK WILLIAM WOLFF.

Copies of this patent may be obtained for five cents each, by addressing the "Commissioner of Patents. Washington, D. C."